(12) United States Patent
Amsterdam et al.

(10) Patent No.: US 9,049,415 B2
(45) Date of Patent: Jun. 2, 2015

(54) USER-SPECIFIED EVENT-BASED REMOTE TRIGGERING OF A CONSUMER DIGITAL VIDEO RECORDING DEVICE

(71) Applicant: International Business Machines Corporation, Armonk, NY (US)

(72) Inventors: Jeffrey D. Amsterdam, Marietta, GA (US); Kulvir S. Bhogal, Pflugerville, TX (US); Gregory J. Boss, American Fork, UT (US); Rick Allen Hamilton, II, Charlottesville, VA (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 13/909,676

(22) Filed: Jun. 4, 2013

(65) Prior Publication Data

US 2013/0266293 A1    Oct. 10, 2013

Related U.S. Application Data

(63) Continuation of application No. 12/259,906, filed on Oct. 28, 2008, now abandoned.

(51) Int. Cl.
*H04N 5/76* (2006.01)
*H04N 9/79* (2006.01)
(Continued)

(52) U.S. Cl.
CPC . *H04N 9/79* (2013.01); *H04N 5/76* (2013.01); *H04N 5/765* (2013.01); *H04N 5/781* (2013.01); *H04N 5/85* (2013.01); *H04N 9/8205* (2013.01)

(58) Field of Classification Search
CPC .................................. H04N 9/79; H04N 5/76
USPC .............................. 386/291, 296; 725/38, 141
See application file for complete search history.

(56) References Cited

U.S. PATENT DOCUMENTS

| 4,737,993 A | 4/1988 | DeVilbiss |
| 5,757,441 A | 5/1998 | Lee et al. |

(Continued)

FOREIGN PATENT DOCUMENTS

| JP | 2007174255 A | * | 7/2007 |
| WO | WO 00/74377 | * | 12/2000 |

OTHER PUBLICATIONS

Office Action in U.S. Appl. No. 12/259,906 mailed on Dec. 7, 2011.
(Continued)

*Primary Examiner* — David Harvey
(74) *Attorney, Agent, or Firm* — Mitch Harris, Atty at Law, LLC; Andrew M. Harris; John R. Pivnichny

(57) ABSTRACT

A method, digital video recording (DVR) device/system and computer program provide a mechanism for recording video content associated with unpredictable events. A user specifies particular event classifications, keywords, or other control parameters from which the occurrence of an event can be determined, and when such event is detected, the DVR is triggered to record content from a specified channel/location. The events can be detected from feeds such as RSS feeds, websites, video content scans or other mechanisms. The event detection may be provided by a remote service that is accessible for user-configuration via a network, or the event detection may be performed in a DVR device or local computer system.

9 Claims, 4 Drawing Sheets

(51) Int. Cl.
  *H04N 5/765*  (2006.01)
  *H04N 5/781*  (2006.01)
  *H04N 5/85*   (2006.01)
  *H04N 9/82*   (2006.01)

(56) References Cited

U.S. PATENT DOCUMENTS

| | | | |
|---|---|---|---|
| 5,808,662 | A | 9/1998 | Kinney et al. |
| 6,212,327 | B1* | 4/2001 | Berstis et al. ................ 386/291 |
| 6,590,618 | B1 | 7/2003 | Park et al. |
| 7,113,773 | B2 | 9/2006 | Quick, Jr. et al. |
| 7,114,172 | B2 | 9/2006 | Lord |
| 7,246,367 | B2 | 7/2007 | Livonen |
| 7,669,219 | B2 | 2/2010 | Scott, III |
| 7,890,849 | B2* | 2/2011 | Moraveji et al. ............ 715/203 |
| 2002/0087661 | A1 | 7/2002 | Matichuk et al. |
| 2002/0104088 | A1* | 8/2002 | McGee et al. ................ 725/51 |
| 2003/0016673 | A1 | 1/2003 | Pendakur et al. |
| 2003/0056220 | A1 | 3/2003 | Thornton et al. |
| 2003/0086408 | A1 | 5/2003 | Goel |
| 2003/0086694 | A1 | 5/2003 | Davidsson |
| 2003/0099462 | A1 | 5/2003 | Matsugami |
| 2003/0156827 | A1 | 8/2003 | Janevski |
| 2003/0219228 | A1 | 11/2003 | Thiagarajan et al. |
| 2004/0031051 | A1* | 2/2004 | Kim et al. ..................... 725/58 |
| 2004/0117832 | A1 | 6/2004 | Kozlowski |
| 2004/0151474 | A1 | 8/2004 | Suh |
| 2005/0246749 | A1 | 11/2005 | Tsuruga et al. |
| 2006/0052067 | A1 | 3/2006 | Singh et al. |
| 2006/0062147 | A1 | 3/2006 | Dougall et al. |
| 2006/0174293 | A1 | 8/2006 | Ducheneaut |
| 2006/0288361 | A1 | 12/2006 | White Eagle et al. |
| 2007/0189708 | A1 | 8/2007 | Lerman et al. |
| 2007/0204319 | A1* | 8/2007 | Ahmad et al. ................ 725/134 |
| 2007/0283403 | A1 | 12/2007 | Eklund et al. |
| 2008/0010518 | A1 | 1/2008 | Jiang et al. |
| 2008/0027734 | A1* | 1/2008 | Zhao et al. .................... 704/502 |
| 2008/0086743 | A1 | 4/2008 | Cheng et al. |
| 2008/0189380 | A1 | 8/2008 | Bosworth |
| 2008/0313402 | A1 | 12/2008 | Wong et al. |
| 2009/0044216 | A1 | 2/2009 | McNicoll |
| 2009/0074380 | A1 | 3/2009 | Boston et al. |
| 2009/0199013 | A1 | 8/2009 | Raciborski et al. |
| 2009/0220216 | A1 | 9/2009 | Marsh et al. |
| 2009/0263101 | A1 | 10/2009 | Rudolph et al. |
| 2010/0107104 | A1 | 4/2010 | Bruce et al. |
| 2011/0030012 | A1 | 2/2011 | Diaz Perez |

OTHER PUBLICATIONS

Final Office Action in U.S. Appl. No. 12/259,906 mailed on May 15, 2012.
Office Action in U.S. Appl. No. 12/259,906 mailed on Oct. 3, 2012.
Final Office Action in U.S. Appl. No. 12/259,906 mailed on Apr. 11, 2013.

* cited by examiner

USER-SPECIFIED EVENT-BASED REMOTE TRIGGERING OF A CONSUMER DIGITAL VIDEO RECORDING DEVICE

This U.S. Patent Application is a Continuation of U.S. patent application Ser. No. 12/259,906, filed on Oct. 28, 2008, and claims priority thereto under 35 U.S.C. §120.

BACKGROUND OF THE INVENTION

1. Field of the Invention

The present invention is related to consumer digital video recording devices (DVRs), and more particularly to a method, system and DVR that trigger recording in response to user-specified events.

2. Description of Related Art

Digital video recorder (DVRs), which may be in the form of a portable device such as a personal video recorder (PVR), a set-top box or a computer having a video interface and/or video capability provided from a digital or analog network source are becoming ubiquitous in households and other locations.

Remotely controlled recording and DVR management on both local area networks and via the Internet have been proposed for web-based and application-based program guide software and the like. However, there are conditions under which a DVR/PVR user might want to record a particular broadcast program or capture other video sources having content that is of interest, but the timing and/or occurrence of which are unpredictable. For example, the DVR/PVR user might be viewing another program and therefore is unable to notice the availability of interesting content on another channel, or the user may be away from their DVR/PVR when an event and/or sporadic content transmission occurs.

The only presently known alternative to recording the above-described content is to consistently record particular programs or to record a large amount of video data and search through the recorded content to find the content of interest. Since most systems designed for time-shifting or pre-programmed recording only capture a single channel at a time, content of particular interest can be easily missed by such systems. Further, a large amount of re-writable storage or a large number of non-rewritable media can be consumed by such recording.

Therefore, it would be desirable to provide a method and system that can trigger a DVR/PVR to record content of interest without requiring pre-programming of channels and recording times and without relying on a time-shifting type recorder that may only record a single channel.

BRIEF SUMMARY OF THE INVENTION

The invention is embodied in a method, a digital video recording device (DVR), and a computer program product. The computer program product may be a server application, an application executing within a DVR, or an application executed by a general-purpose computer such as a personal computer. The digital video recording device may be a personal video recorder (PVR), set-top box, personal computer, or any other device that provides recording of video content.

A user specifies event detection control parameters that select particular event types that are associated with content of interest. The control parameters may be keywords, numerical criteria such as stock or index prices/volume, uniform resource locators (URLs) and associated specifiers that permit detection of content changes at a specified URL, content embedded within a feed such as a Really Simple Syndication (RSS) feed, or any other event-specifying object or data that will permit a software application to determine whether or not an event of interest has occurred. In response to detection of an event, the DVR is directed to record content from a particular channel, URL, or other selectable video source. The video source for recording may be specified by an event type classifier, may be a fixed pre-specified source, or may be determined from the detected content. The end time for recording may be pre-specified, determined from the type of event and/or selected video source, may be determined from the video source itself, or from the detected content.

The event detection may be performed locally, within the DVR device or a system such as a personal computer, or the event detection may be performed by a service configurable via a network that delivers trigger information to a local system or DVR device.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to systems that trigger recording in digital video recorders (DVRs). In order to provide the capability to capture information (e.g., news programs) relevant to unpredictable/sporadic events, a user selects events or event types and a data source. The user further specifies a channel and/or program for recording in response to detection of the event, and optionally a start/stop time or duration. A program detects the events or events matching an event type in the data source and triggers the DVR to record the specified program/channel. The events may be specified by keywords or other data matching criteria such as a numeric range, e.g., for matching stock/index prices, weather temperature, etc. The matching and configuration can be performed in a web service that triggers one or more enrolled DVRs, or can be performed locally in the DVR or a connected computer system. The events can be detected in a variety of network data sources, e.g., in response to an RSS feed or timed "scraping" of a web page to detect changes corresponding to the event or event types.

Figure 1:
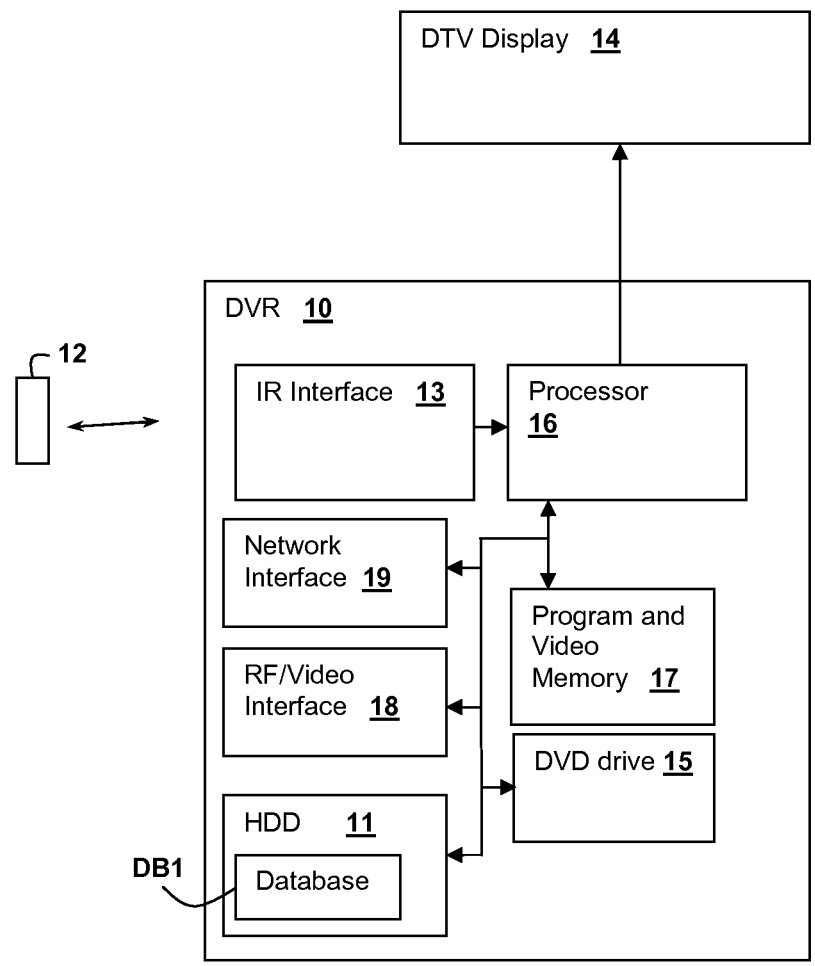
FIG. 1 is a block diagram illustrating a digital video recorder (DVR) in accordance with an embodiment of the present invention.

Referring now to FIG. 1, a digital video recorder (DVR) 10, in accordance with an embodiment of the invention, is shown. DVR 10 is connected to an external digital television (DTV)

display 14, but DVR 10 may alternatively be a portable device having an integral display. A remote control 12 is used to control operation of DVR 10, in the exemplary embodiment according to methods of the present invention, in order to provide user input. However, it is understood that other user input methodologies can be employed, such as buttons and other controls integral to DVR 10. DVR 10 includes an infrared (IR) interface 13 for receiving commands from remote control 12, a processor 16 for executing program instructions that trigger recording in response to detected events in accordance with methodologies described in further detail below, and also provides control and other functionality as generally associated with DVR operations. A program and video memory 17 is coupled to processor 16 for storing data and program instructions, including program instructions in accordance with a computer program product embodiment of the present invention. A radio-frequency (RF)/video interface 18 receives video signals or RF signals from broadcast, closed-circuit or other video streaming sources and provides them for selection by processor 16 for ultimate display by DTV display 14. A network interface 19 provides connection to public or private networks such as the Internet, for receiving information such as RSS feeds or other feeds associated with programs received from RF/Video interface 18. DVR 10 can also be configured to detect keywords or other indicators, such as numeric values located in data sources such as web pages or other files specified by Uniform Resource Locators (URLs). Network interface 19 may also be specified as a video source, receiving video streams (e.g., MPEG streams) at the specified URLs or other URLs. A digital versatile disc (DVD) drive 15 and hard disk drive (HDD) 11 are also included in DVR 10 both for recording video program and other information. A database DB1 within HDD 11 stores user specified event indicators and data sources, so that DVR 10 can, for example, automatically enroll in and examine feeds or periodically check for keywords or other indicators within data at specified URLs.

Figure 2:
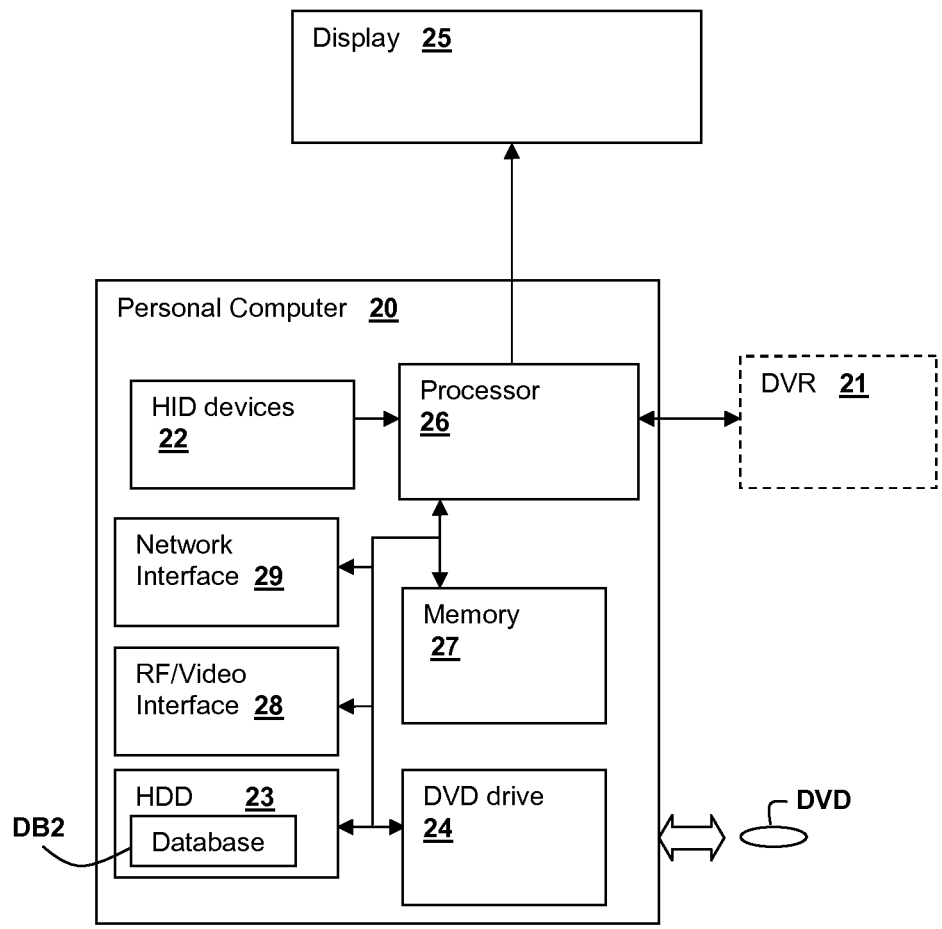
FIG. 2 is a block diagram illustrating a digital video recorder (DVR) in accordance with another embodiment of the present invention.

Referring now to FIG. 2, a DVR in accordance with another embodiment of the invention is illustrated, in the form of a personal computer system 20. The DVR is implemented by personal computer 20, which includes a processor 26 coupled to a memory 27 for storing program instructions including program instructions for implementing a DVR, for example by executing a third-party DVR program. Memory 27 further includes program instructions for carrying out techniques in accordance with the present invention, which may be integrated in such DVR program, or may be provided by a stand-alone application or plug-in that triggers video recording. In an alternative embodiment, a stand-alone DVR 21, may be interfaced to personal computer 20, with an application or service within personal computer 20 providing detection of events from specified data sources and triggering recording by DVR 21 in response to the detection of the events. The application or service program may be loaded into memory 27 or HDD 23 from a DVD drive 24 from a data storage media forming a computer program product in accordance with an embodiment of the present invention, such as DVD disc DVD. In order to receive video information from closed-circuit or broadcast sources, personal computer 20 includes an RF/Video interface 28. However, techniques in accordance with an embodiment of the present invention can be performed with respect to video received from a network interface 29 and RF/Video interface 28 is not required in such embodiments. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be internal to personal computer 20. An application or service executing within personal computer 20 provides the configuration of event/event type indicators and channels as described above with respect to FIG. 1 and can trigger recording of video information received at RF/Video interface 18 or network interface 19 to HDD 23 or DVD drive 24 in response to detection of an event of interest. A database DB2 within HDD 23 stores the user-specified event indicators and data sources, so that personal computer 20 can, for example, automatically enroll in and examine feeds or periodically check for keywords or other indicators within data at specified URLs. Alternatively, as mentioned above personal computer 20 may trigger an external DVR device to record specific channels in response to detecting an event.

Figure 3:
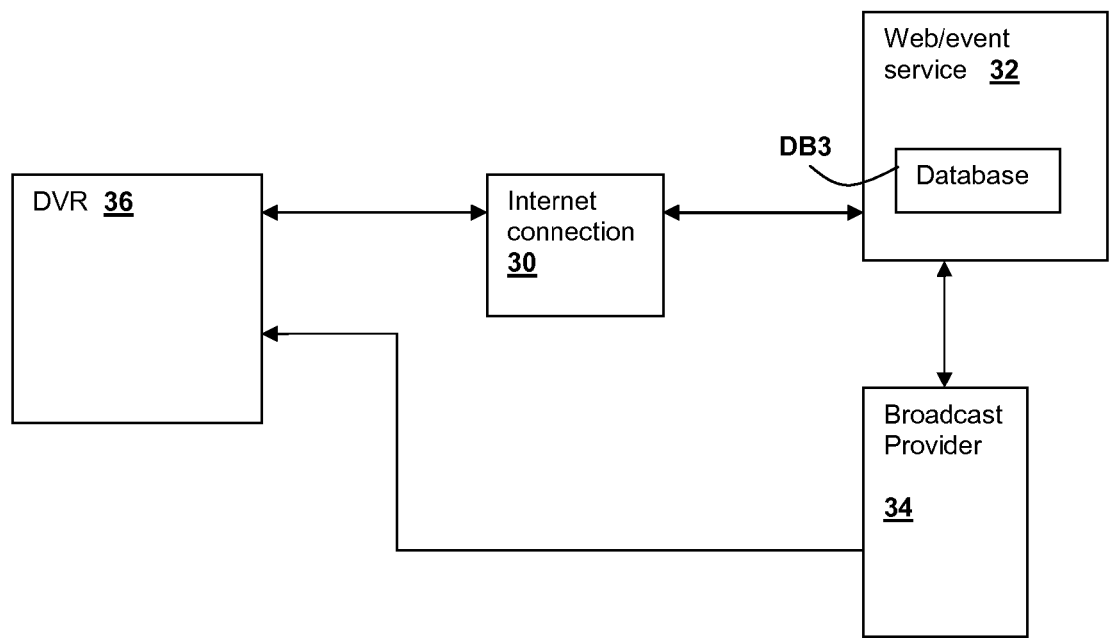
FIG. 3 is a block diagram illustrating a system in accordance with an embodiment of the present invention.

Referring now to FIG. 3, a networked system in accordance with an embodiment of the present invention is shown. A DVR, such as DVR 36, as illustrated in FIG. 1, receives signals from one or more broadcast providers 34, through one or more channels as mentioned above, e.g., RF broadcast, satellite broadcast and/or closed-circuit cable. DVR 36 may also receive video information from a generic network data source, such as an Internet connection 30 or other network connection, which may also carry video data from broadcast provider 34, obviating any need for an RF/Video connection. The above-described data sources from which events are detected can be provided from broadcast provider 34 or any other Internet data source via Internet connection 30 or may be encoded along with video/RF information received directly from broadcast provider 34. For example, broadcast provider 34 may provide RSS feeds available through Internet connection 30 directly, or may encode them in out-of-video-band information, for example, an informational or news video channel. If broadcast provider 34 provides feeds from which events can be detected, generally the channel of interest with respect to those events will be specified. When the data source is an arbitrary Internet data source, then the user will generally specify a channel associated with an event or event type, unless the data source also includes channel/program information. A web/event service 32 may provide all of the event detection/user configuration described above with reference to FIGS. 1 and 2 and direct DVR 31 to record particular video program channels when specified events are detected at web/event service 32. Web/event service 32 accesses a database DB3 to store and retrieve event indicators, data sources, specified channels for each of multiple users having accounts on the system. DVR 10 is identified, e.g., by a network address specific to DVR 10, which is also stored in database DB3, and record or schedule-record commands are transmitted to DVR 10 from web/event service 32. The depicted system is only exemplary and is intended to illustrate various locations for providing event data and video programs. However, it is understood that other techniques and system configurations may be applied in accordance with other embodiments of the present invention and the particular system configuration should not be construed as limiting the possible system configurations, data sources and end-user appliances that implement techniques in accordance with the present invention.

Figure 4:
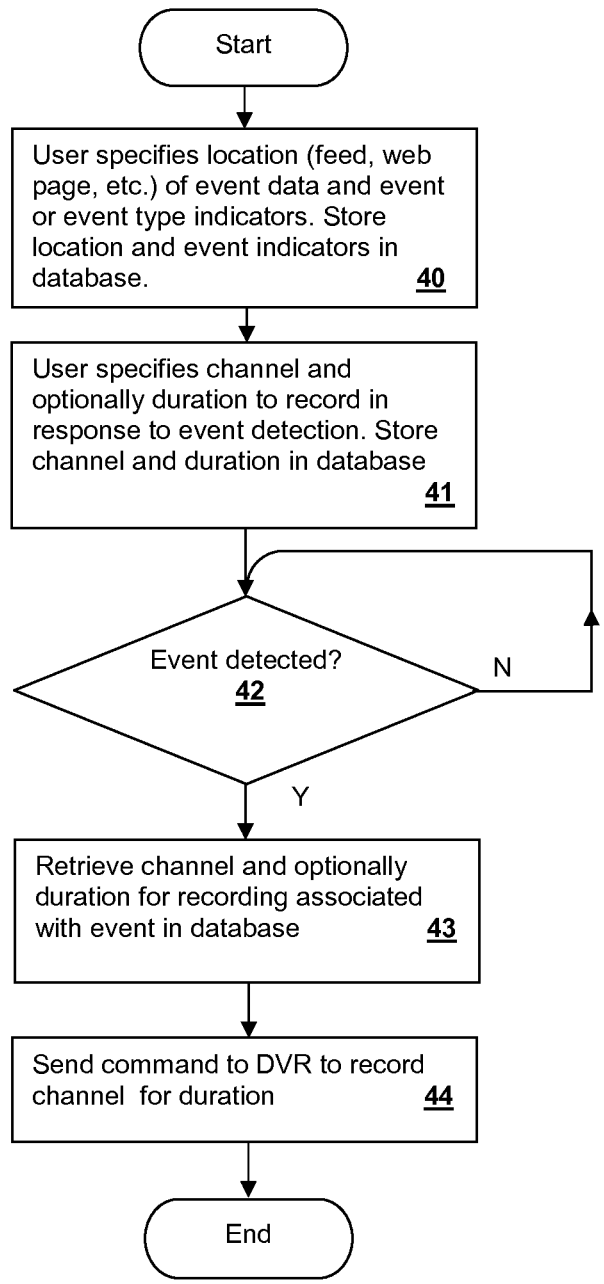
FIG. 4 is a flowchart of a method in accordance with an embodiment of the present invention.

Referring now to FIG. 4, a method according to an embodiment of the present invention is illustrated in a flowchart. First, a user specifies a data source as a location for event data and an event or event type (e.g., particular keywords) and the location and event information are stored in a database (step 40). The user also specifies a channel and optionally a duration to record in response to detection of the event specified in step 40 and the channel and duration are stored in the database (step 41). When the event is detected in the data source (decision 42), the channel and optional duration are retrieved from the database (step 43) and a command is sent to the DVR to record the channel for the specified duration (step 44). As an example, the user may specify one data source as an RSS XML feed that encodes stock price information as textual and numeric information including stock prices, volumes and stock identifier. The user may specify, in step 40, that the DVR should record a financial news channel for 30 minutes upon detecting that the price of XYZ corporation (symbol "XYZC") stock reaches $100. The local event detecting program (e.g., in DVR 10 of FIG. 1 or personal computer 20 of FIG. 2) or service provider server program (e.g., at web/event service 32 of FIG. 3) receives the RSS feed, detects symbol "XYZC" and extracts current stock price information. If the current stock price is greater than or equal to $100, then the DVR is programmed to record the financial news channel for 30 minutes.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of triggering a video recording device to record video from a predetermined broadcast channel, the method comprising:
   a processor receiving user input specifying keywords describing an event type of interest to a user;
   subsequent to the processor receiving the user input, the processor automatically scanning a web page previously selected by the user; and
   the processor matching words in the webpage with the keywords specified by the user, and in response, the processor triggering the video recording device to select and record the predetermined broadcast channel, wherein the words in the web page are not associated with a broadcast source of the broadcast channel, and wherein the words in the web page are not derived from content provided by the broadcast channel or any video program provided by the broadcast source.

2. The method of claim 1, wherein the video recording device selects the predetermined broadcast channel from a plurality of predetermined broadcast channels, wherein each of the plurality of predetermined broadcast channels is associated with a corresponding one of a plurality of event types, wherein the receiving user input specifying keywords receives keywords corresponding to each of the plurality of event types, wherein the method further comprises determining a detected event type corresponding to the keywords that match the words in the webpage, and wherein the selecting selects the predetermined broadcast channel corresponding to the detected event type.

3. The method of claim 1, wherein the web page further provides data encoding numeric information, and wherein the user input specifies at least one numeric threshold for a value within the numeric information, and wherein the method further comprises the processor detecting that the value is equal to the at least one numeric threshold, and wherein the processor triggering the digital video device to select and record the broadcast channel is only performed if the processor detects that the value is equal to the at least one numeric threshold.

4. A system for recording video from a predetermined broadcast channel, the system comprising:
   a processor;
   a computer readable memory;
   a computer readable storage device;
   program instructions, stored on the computer readable storage device for execution by the processor via the computer readable memory, the program instructions comprising:
   program instructions to receive user input specifying keywords describing an event type of interest to a user;
   program instructions to automatically scan a web page previously selected by the user;
   program instructions to match words in the webpage with the keywords specified by the user; and
   program instructions to trigger the video recording device to select and record the predetermined broadcast channel, wherein the words in the web page are not associated with a broadcast source of the broadcast channel, and wherein the words in the web page are not derived from content provided by the broadcast channel or any video program provided by the broadcast source.

5. The system of claim 4, wherein the video recording device selects the predetermined broadcast channel from a plurality of predetermined broadcast channels, wherein each of the plurality of predetermined broadcast channels is associated with a corresponding one of a plurality of event types, wherein the program instructions to receive user input specify keywords receives keywords corresponding to each of the plurality of event types, wherein the program instructions further comprise program instructions to determine a detected event type corresponding to the keywords that match the words in the webpage, and wherein the program instructions to trigger the video recording device to select and record select the predetermined broadcast channel corresponding to the detected event type.

6. The system of claim 4, wherein the web page further provides data encoding numeric information, and wherein the user input specifies at least one numeric threshold for a value within the numeric information, and wherein the program instructions further comprise program instructions to detect that the value is equal to the at least one numeric threshold, and wherein the program instructions to trigger the digital video device to select and record the broadcast channel are only executed if the processor detects that the value is equal to the at least one numeric threshold.

7. A computer program product for triggering video recording, the computer program product comprising a computer-readable storage device having a plurality of program instructions stored therein for execution by a processor of a video recording device, the plurality of program instructions comprising:
   program instructions for receiving user input specifying keywords describing an event type of interest to a user;
   program instructions for automatically scanning a web page previously selected by the user;
   program instructions for matching words in the webpage with the keywords specified by the user; and
   program instructions for triggering the video recording device to select and record the predetermined broadcast channel, wherein the words in the web page are not associated with a broadcast source of the broadcast channel, and wherein the words in the web page are not derived from content provided by the broadcast channel or any video program provided by the broadcast source.

8. The computer program product of claim 7, wherein the video recording device selects the predetermined broadcast channel from a plurality of predetermined broadcast channels, wherein each of the plurality of predetermined broadcast channels is associated with a corresponding one of a plurality of event types, wherein the receiving user input specifying keywords receives keywords corresponding to each of the plurality of event types, wherein the program instructions further comprise program instructions for determining a detected event type corresponding to the keywords that match the words in the webpage, and wherein the program instructions for triggering the video recording device to select and record the predetermined broadcast channel select the predetermined broadcast channel corresponding to the detected event type.

9. The computer program product of claim 7, wherein the web page further provides data encoding numeric information, and wherein the user input specifies at least one numeric threshold for a value within the numeric information, and wherein the program instructions further comprise program instructions for detecting that the value is equal to the at least one numeric threshold, and wherein the program instructions for triggering the digital video device to select and record the broadcast channel are only executed if the processor detects that the value is equal to the at least one numeric threshold.

* * * * *